United States Patent
Ishii

(10) Patent No.: US 6,484,013 B1
(45) Date of Patent: Nov. 19, 2002

(54) DUAL-BAND TRANSCEIVER AND CONTROL METHOD THEREFOR

(75) Inventor: Katsuhiro Ishii, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/334,602

(22) Filed: Jun. 17, 1999

(30) Foreign Application Priority Data

Jun. 18, 1998 (JP) ............................................. 10-171451

(51) Int. Cl.[7] ................................................. H04B 1/38
(52) U.S. Cl. ........................ 455/73; 455/552; 455/553; 455/180.1
(58) Field of Search .............................. 455/73, 78, 86, 455/88, 552, 553, 180.1, 181.1, 182.1, 183.2, 180.3, 188.1, 191.3, 196.1

(56) References Cited

U.S. PATENT DOCUMENTS

| | | | |
|---|---|---|---|
| 5,519,885 A | * | 5/1996 | Vaisanen ..................... 455/552 |
| 5,732,330 A | * | 3/1998 | Anderson et al. ........... 455/552 |
| 5,974,302 A | * | 10/1999 | Adamiecki et al. ....... 455/180.1 |
| 6,069,925 A | * | 5/2000 | Koh .......................... 455/553 |
| 6,115,585 A | * | 9/2000 | Matero et al. ................ 455/58 |
| 6,175,746 B1 | * | 1/2001 | Nakayama et al. ......... 455/102 |
| 6,201,952 B1 | * | 3/2001 | Shimizu et al. .......... 455/180.1 |

FOREIGN PATENT DOCUMENTS

| | | |
|---|---|---|
| JP | 61-131919 | 6/1986 |
| JP | 61-281627 | 12/1986 |
| JP | 5-244032 | 9/1993 |
| JP | 5-244033 | 9/1993 |
| JP | 6-209235 | 7/1994 |
| JP | 10-84299 | 3/1998 |
| JP | 10-145262 | 5/1998 |

* cited by examiner

*Primary Examiner*—William Trost
*Assistant Examiner*—Simon Nguyen
(74) *Attorney, Agent, or Firm*—Young & Thompson

(57) ABSTRACT

A dual-band transceiver operable in two different bands is disclosed. A local oscillator generates a fundamental frequency and a second harmonic frequency. A receiving circuit receives a high-frequency signal in a selected one of the two different bands using the fundamental frequency and a transmitting circuit transmits a high-frequency signal in a selected one of the two different bands using the second harmonic frequency. A transmitting operation in the first band is performed in a time period while a receiving operation in the second band is performed in the time period. A received signal obtained by the receiving operation in the second band in the time period can be used to measure a radio condition of the second band during communication in the first band.

17 Claims, 5 Drawing Sheets

FIG.4
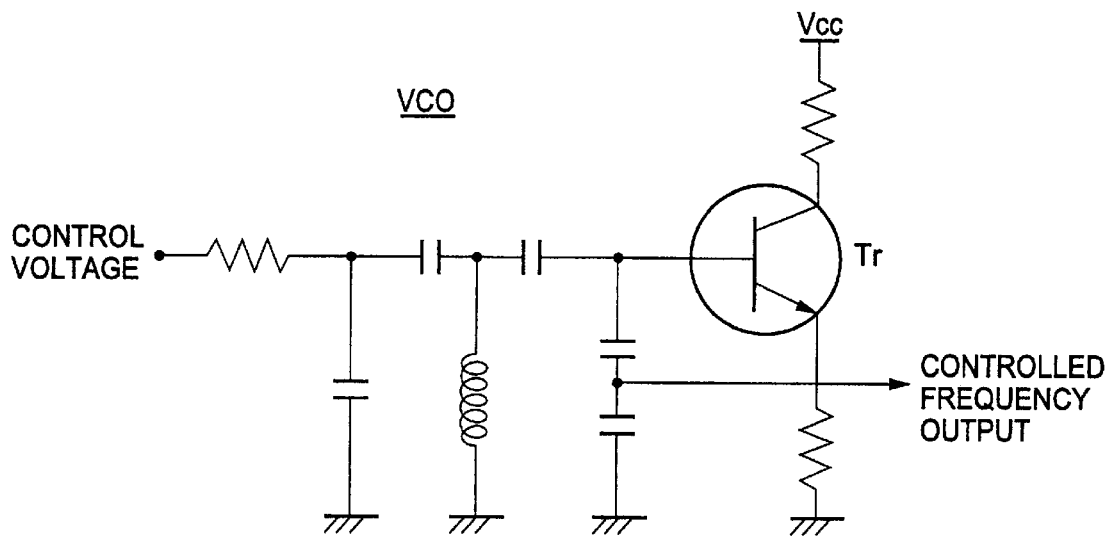
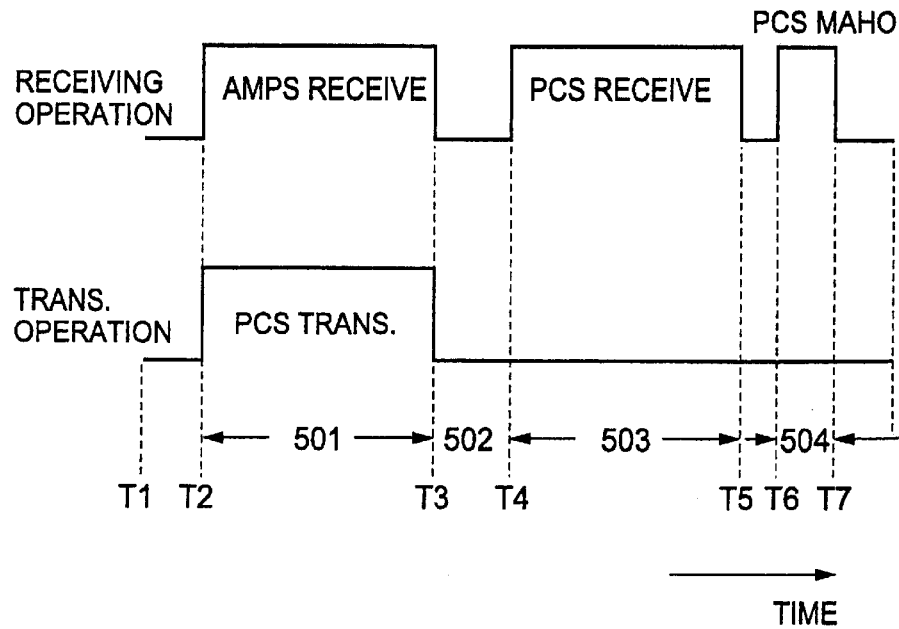
FIG.5A
FIG.5B

FIG.6

| AMPS RECEIVE CHANNEL | 393 | 991 | 799 | 991 | 799 |
|---|---|---|---|---|---|
| PCS TRANS. CHANNEL | 1000 | 1999 | 1 | 1 | 1999 |
| AMPS RECEIVING FREQ. (MHz) | 881.49 | 869.04 | 893.97 | 869.04 | 893.97 |
| FUNDAMENTAL FREQ. f1 OF LO 35(MHz) | 968.34 | 955.89 | 980.82 | 955.89 | 980.82 |
| 2ND HARMONIC FREQ. f2 OF LO 35(MHz) | 1936.68 | 1911.78 | 1961.64 | 1911.78 | 1961.64 |
| PCS TRANS. FREQ. (MHz) | 1879.98 | 1909.95 | 1850.01 | 1850.01 | 1909.95 |
| LOCAL FREQ. (fr) FOR TRANS. OF LO 31(MHz) | 56.7 | 1.83 | 111.63 | 61.77 | 51.69 |

(fR IS FIXED TO 86.85MHz)

DUAL-BAND TRANSCEIVER AND CONTROL METHOD THEREFOR

BACKGROUND OF THE INVENTION

1. Field of the Invention

The present invention relates to a dual-band transceiver and in particular to a dual-band transceiver and its control method which are capable of performing transmission and reception operations in two different bands.

2. Description of Related Art

At present, there have been remarkably widely used mobile terminals in the mobile communication field, and there exist a plurality of systems with a large difference of frequency bands used. Under this circumstance, in order to improve the convenience for users, there has been a market demand that the users should be placed in a position to be able to utilize the plurality of systems with one set of terminal.

Various proposals have been made so far to meet such market demand. For example, Japanese Patent Application Laid-open Publication Nos. 5-244032 and 5-244033 disclose techniques in which two series of transmission systems and receiving systems are provided in a radio frequency stage, and frequency converters common to the two series of transmission systems and receiving systems are equipped with local oscillators respectively, thereby to make it possible to switch local frequencies generated by the local oscillators between a first frequency band and a second frequency band.

Further, Japanese Patent Application Laid-open Publication No. 10-84299 discloses a technique in which two series of transmission systems and receiving systems are provided respectively to make it possible to connect these systems to an antenna by switching between the systems.

On the other hand. Japanese Patent Application Laid-open Publication Nos. 61-131919 and 61-281627 disclose techniques in which a frequency converter for a transmission system and a receiving system is equipped with a shared single local oscillator, to make it possible to carry out a transmission and a receiving of signals in two different frequency bands with physically one circuit by utilizing a fundamental wave and a higher harmonic of the single local oscillator.

According to the techniques described in Japanese Patent Application Laid-open Publication Nos. 5-244032, 5-244033 and 10-84299, it is necessary to provide a plurality of transmitting and receiving circuits or a plurality of high-frequency local oscillators, and this becomes a big barrier in achieving a compact and light-weight terminal.

Further, according to the techniques disclosed in Japanese Patent Application Laid-open Publication Nos. 61-131919 and 61-281627, it is possible to make the terminal compact and light-weighted. However, since a fundamental frequency and its harmonics generated by the single high-frequency local oscillator are not used simultaneously and the frequencies are used in switchover, it needs a switching circuit and the complicated switching control thereof.

SUMMARY OF THE INVENTION

It is, therefore, an object of the present invention to provide a dual-band transceiver and a control method therefore, which make it possible to concurrently carry out a transmission operation and a receiving operation in two different bands with simplified circuit configuration.

Another object of the present invention to provide a dual-band transceiver and a control method therefore, which can achieve receiving and transmitting operations in a time-division fashion at one band while monitoring the signal strength at the other band.

According to a first aspect of the present invention, a dual-band transceiver operable in two different bands consisting of a first band and a second band, includes a local oscillator for generating a first local signal having a first frequency and a second signal having a second frequency which is a multiple of the first frequency; a receiving circuit for receiving a high-frequency signal in a selected one of the two different bands using the first local signal; a transmitting circuit for transmitting a high-frequency signal in a selected one of the two different bands using the second local signal; and a controller controlling the local oscillator and the receiving and transmitting circuits such that a transmitting operation in the first band is performed in a time period while a receiving operation in the second band is performed in the time period.

Since a single local oscillator is used to enable transmitting and receiving operations in the two different bands, a simplified circuit can be achieved. Further, since the receiving operation in the second band can be performed during the transmission operation in the first band, it is possible to monitor the propagation condition of the second band during communication in the first band.

According to a second aspect of the present invention, a dual-band transceiver includes: a local oscillator for generating a first local signal having a first frequency and a second signal having a second frequency which is a multiple of the first frequency, wherein the first frequency is variable; a receiving local oscillator for generating a receiving local signal having a variable receiving local frequency; a transmitting local oscillator for generating a transmitting local signal having a variable transmitting local frequency; a receiving circuit for receiving a high-frequency signal in a selected one of the two different bands using the first local signal and the receiving local signal; a transmitting circuit for transmitting a high-frequency signal in a selected one of the two different bands using the second local signal and the transmitting local signal; and a controller controlling the local oscillator the receiving and transmitting local oscillators, and the receiving and transmitting circuits such that a transmitting operation in the first band is performed in a time period while a receiving operation in the second band is performed in the time period.

The controller may control the local oscillator such that the first frequency is set to near the second band and the second frequency is set to near the first band and further control the receiving and transmitting local oscillators such that the variable receiving local frequency is set to enable the receiving operation in the second band and the variable transmitting local frequency is set to enable the transmitting operation in the first band.

Since an oscillator generating a relatively low frequency can be used as the receiving and transmitting local oscillators, a simplified circuit can be achieved. Since at least one of the receiving and transmitting local frequency is variable, the receiving and transmitting circuits is allowed to be highly adaptable to any dual-mode system.

BRIEF DESCRIPTION OF THE DRAWINGS

FIG. 4 is a circuit diagram of a Colpitt's oscillator for use in a voltage-controlled oscillator of the frequency-variable local oscillator;

FIG. 5 is a timing chart showing an operation of the dual-band transceiver according to the embodiment; and FIG. 6 is a diagram showing a frequency assignment table for explanation of the operation of the dual-band transceiver according to the embodiment.

DETAILED DESCRIPTION OF THE PREFERRED EMBODIMENT

Figure 1:
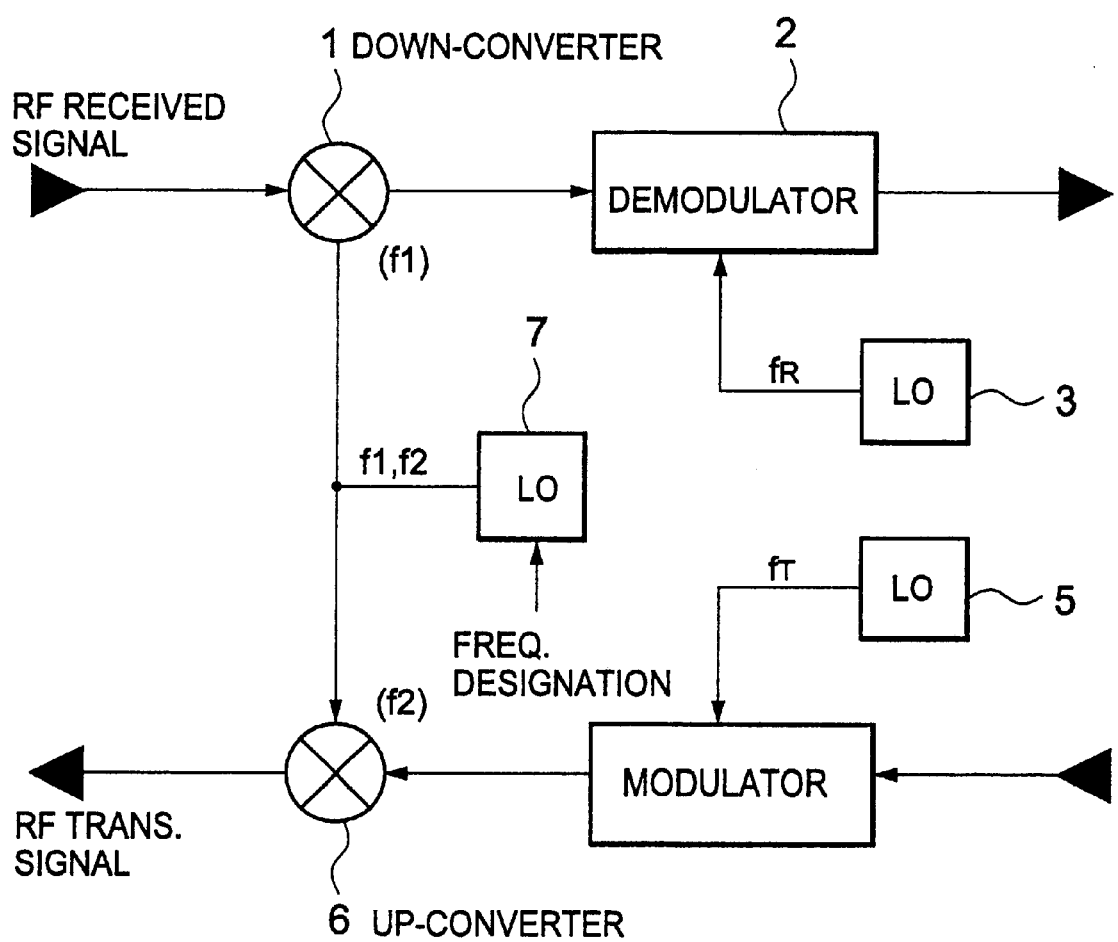
FIG. 1 is a conceptual diagram showing the circuit configuration of a dual-band transceiver according to the present invention.

Referring to FIG. 1, a dual-band transceiver according to an embodiment of the invention is provided with a receiving system composed of a down-converter 1, a demodulator 2 and a receiving local oscillator 3, and a transmitting system composed of a modulator 4, a transmitting local oscillator 5 and an up-converter 6. The transceiver is further provided with a high-frequency local oscillator 7 which supplies a high-frequency oscillation signal to the down-converter 1 and the up-converter 6. The down-converter 1 and the up-converter 6 are a mixer for mixing different frequencies to produce a desired frequency.

The high-frequency oscillation signal generated by the high-frequency local oscillator 7, as will be described later, includes a fundamental frequency f1 and its second harmonic f2 (=2×f1) which are designated by a controller (not shown). In this case, a filter may be provided in the down-converter 1 and the up-converter 6 in order to prevent an unnecessary frequency signal from being mixed into a following stage. Although the high-frequency oscillation signal including the fundamental frequency f1 and its second harmonic f2 is applied to both the down-converter 1 and the up-converter 6, the fundamental frequency f1 is used by the down-converter 1 to convert a received radio-frequency (RF) signal to an intermediate-frequency (IF) signal and the second harmonic f2 is used by the up-converter 6 to convert a transmission IF signal to an transmission RF signal.

The fundamental frequency f1 of the high-frequency local oscillator 7 is determined by the frequency designation signal and the fundamental frequency f1 is used for receiving and its second harmonic f2 is used for transmission. Therefore, by adjusting one or both of the oscillation frequency $f_R$ of the receiving local oscillator 3 and the oscillation frequency $f_T$ of the transmitting local oscillator 5, desired setting of transmitting and receiving frequencies can be achieved.

In FIG. 1, it is also possible to provide a variable band-pass filter between the down-converter 1 and the high-frequency local oscillator 7 and between the up-converter 6 and the high-frequency local oscillator 7 respectively. In this case, a local signal of a corresponding converter may be extracted from an output of the high-frequency local oscillator 7 by the corresponding band-pass filter.

Figure 2:
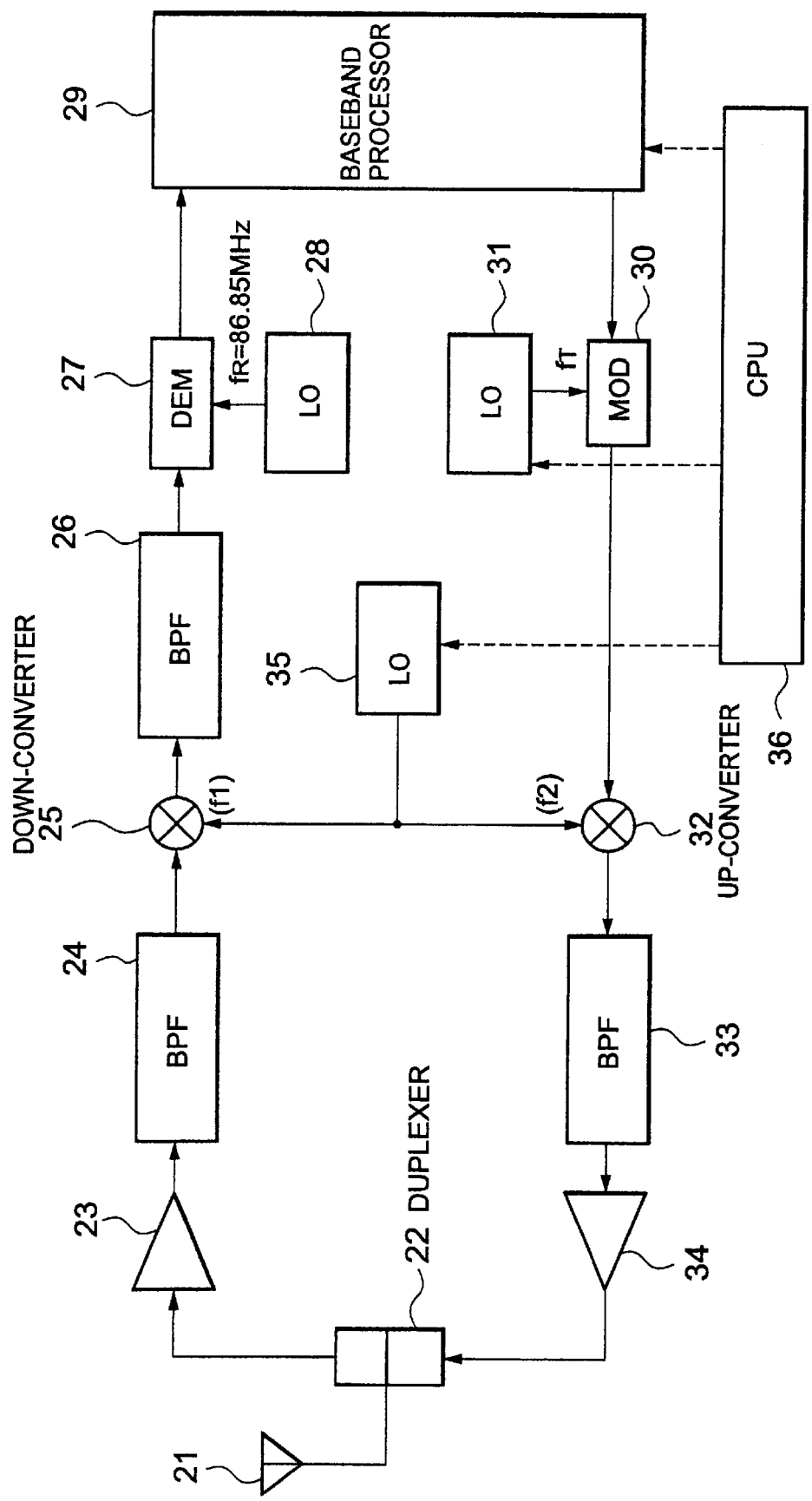
FIG. 2 is a detailed block diagram showing the configuration of a dual-band transceiver according to an embodiment of the present invention.

Referring to FIG. 2, an antenna 21 is connected to a duplexer 22. The duplexer 22 is connected to the input terminal of a receiving radio frequency amplifier 23 and the output terminal of the receiving radio frequency amplifier 23 is connected to the first input terminal of a down-converter 25 through a receiving radio frequency band-pass filter 24. The second input terminal of the down-converter 25 is connected to an output terminal of a high-frequency local oscillator 35, and an output terminal of the down-converter 25 is connected to the first input terminal of a demodulator 27 through a receiving intermediate-frequency band-pass filter 26. The second input terminal of the demodulator 27 is connected to an output terminal of a receiving local oscillator 28, and the output terminal of the demodulator 27 is connected to an input terminal of a base-band processor 29. In this embodiment, as will be described later, the receiving local oscillator 28 generates a fixed local frequency $f_R$ (here, assuming $f_R$=86.85 MHz).

An output terminal of the base-band processor 29 is connected to a first input terminal of a modulator 30. The second input terminal of the modulator 30 is connected to the output terminal of a transmitting oscillator 31, and the output terminal of the modulator 30 is connected to a first input terminal of an up-converter 32. The second input terminal of the up-converter 32 is connected to the output terminal of the high-frequency local oscillator 35, and the output terminal of the up-converter 32 is connected to a transmitting radio frequency power amplifier 34 through a transmitting radio frequency band-pass filter 33. The output terminal of the transmitting radio frequency power amplifier 34 is connected to the input terminal of the duplexer 22.

Then, a control processor (CPU) 36 controls the baseband processor 29, the local frequency $f_T$ of the transmitting local oscillator 31, the local frequency of the high-frequency local oscillator 35, and the other circuits. The CPU 36 controls the operations of the transceiver including a communication control such as PCS (Personal Communications Service) conforming to IS-136 and AMPS (Advanced Mobile Phone Service) and a band switching control between two different bands (here, PCS and AMPS). The PCS is a system using a plurality of frequencies in time-division fashion, which is a kind of TDMA (time division multiple access) system.

Figure 3:
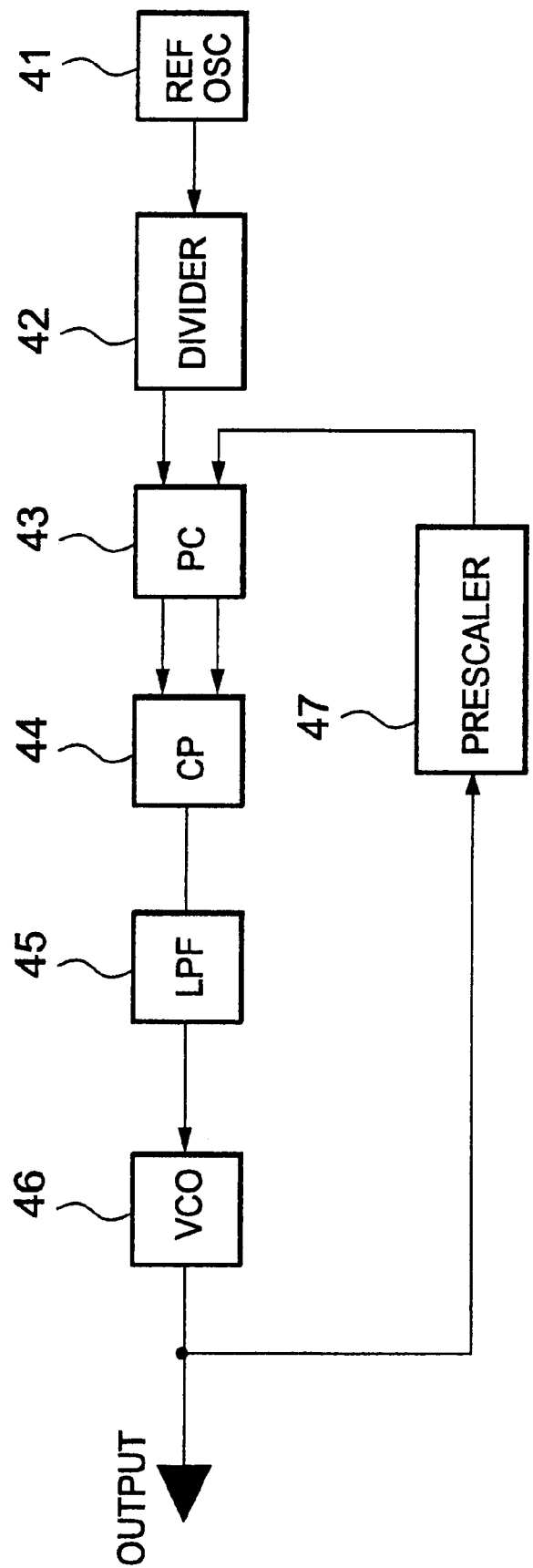
FIG. 3 is a block diagram showing an example of a frequency-variable local oscillator employed in the embodiment.

Furthermore, although the receiving local oscillator 28 is explained as a frequency-fixed type in the above, this may also be a frequency-variable type local oscillator. Each of the frequency-variable local oscillators (the transmitting local oscillator 31 and the high-frequency local oscillator 35) is structured by, for example, a programmable frequency synthesizer as shown in FIG. 3. The receiving local oscillator 28 is also structured similarly if it is frequency-variable.

Referring to FIG. 3, the frequency synthesizer includes a reference frequency generator 41, a reference divider 42, a phase comparator 43, a charge pump 44, a low-pass filter 45, a voltage-controlled oscillator 46, and a prescaler 47.

As the operation of this type of frequency synthesizer is well known, only its outline will be explained. In the circuit configuration as shown in FIG. 3, a signal of the reference frequency generated by the reference frequency generator 41 is frequency-divided by the reference divider 42. The output signal of the voltage control oscillator 46 is frequency-divided by the prescaler 47. The phase comparator 43 compares a progress or delay of the phases between the signal frequency-divided by the reference divider 42 and the signal frequency-divided by the prescaler 47, and outputs a pulse signal based on a comparison result. The pulse signal output by the phase comparator 43 is changed Into an analog signal by the charge pump 44, and is then smoothed by the low-pass filter 45, to become a control voltage for the voltage control oscillator 46.

The voltage-controlled oscillator 46 oscillates stably at a frequency corresponding to the control voltage. In the above operation, when the frequency dividing ratio of the reference divider 42 is set at a certain value and when the frequency dividing ratio of the prescaler 47 is set at a smaller value than this, the oscillation frequency of the voltage-controlled oscillator 46 becomes lower based on the frequency determined by the frequency dividing ratio of the reference divider 42. On the other hand, when the frequency dividing ratio of the prescaler 47 is set at a larger value, the oscillation frequency of the voltage control oscillator 46 becomes higher. In other words, the oscillation frequency of the voltage-controlled oscillator 46 can be changed optionally by controlling the frequency dividing ratios of the reference divider 42 and the prescaler 47.

As shown in FIG. 4, the voltage-controlled oscillator 46 may be formed by the well-known Colpitt's oscillator. From a nonlinear operation of a transistor Tr itself, it is known that this oscillator outputs a signal which includes a fundamental frequency according to the control voltage from outside and a higher harmonic of the fundamental frequency.

An operation of the dual-band transceiver will be explained hereafter. In the present embodiment, transmission and reception operations are carried out based on a dual band system which assumes that a radio wave of AMPS (Advanced Mobile Phone Service) band is received for measuring a received electric field strength while keeping communications according to PCS (Personal Communications Service) conforming to IS-136 that is one of digital portable telephone systems in TDMA (Time Division Multiple Access) system.

To facilitate understanding, basic transmitting and receiving operations will be explained first with reference to FIG. 2, followed by a detailed explanation of the dual-band transmitting and receiving operation with reference to FIGS. 5 and 6.

In FIG. 2, a basic receiving operation is carried out as follows. A radio signal received by the antenna 21 is output to the receiving radio frequency amplifier 23 through the duplexer 22. The received signal amplified by the receiving radio frequency amplifier 23 is filtered for a desired receiving band by the receiving radio frequency band-pass filter 24, and is output to the down-converter 25.

The down-converter 25 mixes the received signal from the receiving radio frequency band-pass filter 24 with a receiving local signal of the fundamental frequency f1 generated by the high-frequency local oscillator 35 to produce an intermediate-frequency signal of a predetermined frequency which is a sum or a difference of them. The fundamental frequency f1 is designated according to the frequency designation signal received from the CPU 36. The intermediate-frequency signal is output to the receiving intermediate-frequency band-pass filter 26.

The receiving intermediate-frequency band-pass filter 26 filters out components other than a desired frequency from the intermediate-frequency signal, and outputs the result to the demodulator 27. The demodulator 27 carries out a demodulation processing based on the signal received from the receiving intermediate-frequency band-pass filter 26 using the receiving local signal from the receiving local oscillator 28. The demodulator 27 outputs a demodulated signal to the base-band processor 29. The receiving local frequency $f_R$ of the receiving local oscillator 28 is fixed at a predetermined frequency.

A transmission operation is carried out as follows. A transmission baseband signal is output from the baseband processor 29 to the modulator 30. The modulator 30 modulates the transmission local signal of a variable frequency $f_T$ input from the transmitting local oscillator 31 according to the transmission baseband signal. The modulator 30 outputs the modulated intermediate-frequency signal to the up-converter 32.

The up-converter 32 mixes the transmission modulated signal from the modulator 30 with a transmitting high-frequency local signal of the second harmonic frequency f2 from the high-frequency local oscillator 35. The up-converter 32 outputs a radio frequency signal to the transmitting radio frequency band-pass filter 33. In this case, how to determine the transmitting high-frequency local signal is shown later in a detailed example.

The radio frequency signal is filtered for a predetermined transmission band by the transmitting radio frequency band-pass filter 33, is then amplified by the transmitting radio frequency power amplifier 34. The amplified radio-frequency signal is emitted into free space from the antenna 21 through the duplexer 22.

Next, dual-band transmission and receiving operations will be explained in detail with reference to FIGS. 5 and 6.

Referring to FIG. 5, the CPU 36 performs controls for transmission and reception in PCS system and further is capable of performing AMPS receiving operation during a time period of PCS transmitting operation. The respective frequency bands are prescribed as follows the AMPS reception band ranging from 869 MHz to 894 MHz; the PCS transmission band from 1850 MHz to 1910 MHz; and the PCS reception band from 1930 MHz to 1990 MHz.

In the PSC system, a set of a PCS transmitting operation, a PCS receiving operation and a signal strength measuring operation (PCS MAHO) is repeatedly performed In a period of 20 msec. The respective timing 501 and 503 for the PCS transmission and the PCS reception are 6.67 msec. The PCS MAHO (Mobile Assisted Hand Off) operation is performed in a time period of 5.63 msec following the PCS receiving operation. The PCS MAHO operation is to measure received signal strength in a designated PCS channel (frequency band).

According to the present invention, during the PCS transmitting timing 501, the receiving system can be used to measure received signal strength in the AMPS band. In other words, AMPS radio conditions can be monitored during PCS communication. Therefore, as necessary, the communication mode can be switched from PCS to AMPS with reliability. Since a TDMA communication terminal commercially available is a dual-mode (PCS and AMPS) terminal and the number of AMPS base stations is larger than that of PCS base stations, such a reliable mode switch is useful.

At time Instant T1 in FIG. 5, the CPU 36 designates a PCS transmission/reception channel, that is, a fundamental frequency (f1) of the high-frequency local oscillator 35 to be received or transmitted and therefore the second harmonic frequency (f2) is also generated. More specifically, the high-frequency local oscillator 35 also generates a second higher harmonic (f2) that is two times the wave of the set local signal frequency (f1) as a fundamental wave. The higher harmonic and the fundamental wave are superimposed together and are supplied to the down-converter 25 and the up-converter 32. The down-converter 25 operates by using the fundamental wave as a local frequency, and the up-converter 32 operates by using the second higher harmonic as a local frequency. Further the CPU 36 designates a transmission local signal frequency ($f_T$) of the transmitting local oscillator 31 corresponding to the designated PCS channel. As shown in FIG. 6, the AMPS reception band is composed of frequencies ranging from 869 MHz to 894

MHz depending on designation of AMPS reception channel, and the PCS transmission band is composed of frequencies ranging form 1850 MHz to 1910 MHz depending on designation of PCS transmission channel.

At time instant T2, the CPU 36 controls the high-frequency local oscillator 35, the transmitting local oscillator 31 and the base-band processor 29 to carry out a receiving operation in the AMPS band and a transmission operation in the PCS band. In this case, the transmitting local oscillator 31 is set so as to enable transmission in a designated PCS transmission channel. With this arrangement, the receiving operation in the AMPS band and the transmission operation in the PCS band are carried out in parallel at the same timing period 501.

In the case where the PCS transmission channel is changed from #1000 to #1999 as shown in FIG. 6, the fundamental frequency f1 for reception of the high-frequency local oscillator 35 is changed from 968.34 MHz to 955.89 MHz and the second harmonic f2 for transmission is changed from 1936.68 MHz to 1911.78 MHz. At the same time, the transmitting local frequency $f_T$ of the transmitting local oscillator 31 is changed from 56.7 MHz to 1.83 MHz. Since the receiving local frequency $f_R$ of the receiving local oscillator 28 is fixed to 86.85 MHz, the demodulator 27 can continue to perform demodulation of received AMPS signal at AMPS reception channel #991. Further, since the transmitting local frequency $f_T$ of the transmitting local oscillator 31 is changed to 1.83 MHz, the PCS transmission can be continued at the PCS channel #1999. As shown in FIG. 6, the frequency relationship in the timing period 501 is as follows. AMPS receiving frequency=f1−$f_R$ (here, 86.85 MHz); and PCS transmitting frequency=f2−$f_T$.

At time instant T3, the transmitting and receiving operations carried out during the period 501 is stopped by powering off the receiving radio frequency amplifier 23, the down-converter 25, the demodulator 27, the up-converter 32, and the transmitting radio band power amplifier 34 while keeping the operation of the high-frequency local oscillator 35.

At time instant T4, after a lapse of the time period 502, the CPU 36 controls the base-band processor 29 and the receiving circuit system so that the PCS receiving operation is performed. The transmitting circuit system does not operate (that is, the transmitting circuit system is kept power-off), and the high-frequency local oscillator 35 functions as a receiving local oscillator. The receiving operation is carried out during a time period 503.

At time instant T5, the receiving operation carried out during the period 503 is stopped, and the CPU 36 designates a PCS receiving local frequency f1 for measuring the electric field strength.

At time instant T6, the electric field strength is measured in the assigned PCS band. A mobile telephone terminal measures the received electric field strength of a designated channel based on the instruction from a base station, and this is generally called an MAHO (mobile assisted hand off) operation. During this period 504, the receiving circuit system carries out the PCS reception operation similar to the operation during the period 503 to measure the signal strength.

At time instant T7, the measurement of the electric field strength is finished, and the similar operations is repeated.

As explained above, the PCS transmission, the PCS reception and PCSMAHO are repeated in this order in the PCS operation conforming to IS-136.

While the transmitting and receiving operation has been explained with reference to the timing chart of the IS-136 system as one kind of the TDMA system, it is needless to mention that these timings are determined depending on the specifications of the system from which a user obtains services. It is the same with the relationship of frequencies.

Although the present embodiment shows a case of an application to a mobile telephone, the present invention can also be applied in a similar manner to a PDA (Personal Digital Assistants) or the like if the frequency steps meet the application limit conditions.

Further, the present invention can be applied not only to wireless communications but also wired communications, for example, to a wired local-area network system having a plurality of frequency bands.

As described above, according to the present invention, it is possible to simultaneously allocate local frequencies to the down-converter and the up-converter by utilizing the characteristic that the high-frequency local oscillator generates a fundamental wave and its higher harmonic in superimposition. Accordingly, it becomes possible to carry out the transmitting operation and the receiving operation at the same time in two different frequency bands.

By the present invention, it becomes possible for one system to receive a radio signal to measure the electric field strength thereof at one band while transmitting a radio signal at the other band. This facilitates a switching to a system of better receiving conditions.

Further, since the fundamental wave and the higher harmonic are used at the same time, it is possible to omit a switching circuit, a frequency multiplier circuit and the like. As a result, according to the present invention, it becomes possible to decrease the power consumption and to decrease the circuit scale and the installation area.

What is claimed is:

1. A dual-band transceiver operable in two different bands consisting of a first band and a second band, comprising:
   a local oscillator for generating a first local signal having a first frequency and a second local signal having a second frequency which is a second or higher harmonic of the first frequency;
   a receiving circuit for receiving a high-frequency signal in a selected one of the two different bands using the first local signal;
   a transmitting circuit for transmitting a high-frequency signal in a selected one of the two different bands using the second local signal; and
   a controller controlling the local oscillator and the receiving and transmitting circuits such that a transmitting operation in the first band is performed in a time period while a receiving operation in the second band is performed in the time period.

2. The dual-band transceiver according to claim 1, wherein the controller controls such that a transmitting operation and a receiving operation in the first band are performed in predetermined time-division manner while a receiving operation in the second band is performed in the transmission timing of the first band.

3. The dual-band transceiver according to claim 1, wherein the controller controls the local oscillator such that the first frequency is selectively set to enable the receiving operation in the second band and the transmitting operation in the first band.

4. The dual-band transceiver according to claim 1, wherein the controller uses a received signal obtained by the receiving operation in the second band to monitor a propagation condition in the second band.

5. A dual-band transceiver operable in two different bands consisting of a first band and a second band, comprising:

a local oscillator for generating a first local signal having a first frequency and a second local signal having a second frequency which is a second or higher harmonic of the first frequency, wherein the first frequency is variable;

a receiving local oscillator for generating a receiving local signal having a variable receiving local frequency;

a transmitting local oscillator for generating a transmitting local signal having a variable transmitting local frequency;

a receiving circuit for receiving a high-frequency signal in a selected one of the two different bands using the first local signal and the receiving local signal;

a transmitting circuit for transmitting a high-frequency signal in a selected one of the two different bands using the second local signal and the transmitting local signal; and a controller controlling the local oscillator, the receiving and transmitting local oscillators, and the receiving and transmitting circuits such that a transmitting operation in the first band is performed in a time period while a receiving operation in the second band is performed in the time period.

6. The dual-band transceiver according to claim 5, wherein the controller controls such that a transmitting operation and a receiving operation in the first band are performed in predetermined time-division manner while a receiving operation in the second band is performed in the transmission timing of the first band. transmitting local frequency is set to enable the transmitting operation in the first band.

7. The dual-band transceiver according to claim 5, wherein the first band is associated with PCS (Personal Communications Service) and the second band is associated with AMPS (Advanced Mobile Phone Service).

8. The dual-band transceiver according to claim 5, wherein the controller uses a received signal obtained by the receiving operation in the second band to monitor a propagation condition in the second band.

9. A dual-band transceiver operable in two different bands consisting of a first band and a second band, comprising:

a local oscillator for generating a first local signal having a first frequency and a second signal having a second frequency which is a multiple of the first frequency, wherein the first frequency is variable;

a receiving local oscillator for generating a receiving local signal having a variable receiving local frequency;

a transmitting local oscillator for generating a transmitting local signal having a variable transmitting local frequency;

a receiving circuit for receiving a high-frequency signal in a selected one of the two different bands using the first local signal and the receiving local signal; a transmitting circuit for transmitting a high-frequency signal in a selected one of the two different bands using the second local signal and the transmitting local signal; and a controller controlling the local oscillator, the receiving and transmitting local oscillators, and the receiving and transmitting circuits such that a transmitting operation in the first band is performed in a time period while a receiving operation in the second band is performed in the time period;

wherein the controller controls the local oscillator such that the first frequency is set to near the second band and the second frequency is set to near the first band and further controls the receiving and transmitting local oscillators such that the variable receiving local frequency is set to enable the receiving operation in the second band and the variable transmitting local frequency is set to enable the transmitting operation in the first band.

10. The dual-band transceiver according to claim 9, wherein one of the variable receiving local frequency and the variable transmitting local frequency is fixed.

11. A control method for a dual-band transceiver operable in two different bands consisting of a first band and a second band, the dual-band transceiver comprising:

a local oscillator for generating a first local signal having a first frequency and a second local signal having a second frequency which is a second or higher harmonic of the first frequency;

a receiving circuit for receiving a high-frequency signal in a selected one of the two different bands using the first local signal; and a transmitting circuit for transmitting a high-frequency signal in a selected one of the two different bands using the second local signal, the control method comprising the steps of:

a) causing the receiving and transmitting circuits to perform receiving and transmitting operations in the first band in a predetermined time-division manner; and b) causing the receiving circuit to perform a receiving operation in the second band in transmission timing of the first band.

12. The method according to claim 11, further comprising the step of:

causing the local oscillator to set the first frequency at a selected frequency to enable the receiving operation in the second band and the transmitting operation in the first band.

13. The method according to claim 11, further comprising the step of:

monitoring a propagation condition in the second band based on a received signal obtained by the receiving operation of the step b).

14. A control method for a dual-band transceiver operable in two different bands consisting of a first band and a second band, the dual-band transceiver comprising:

a local oscillator for generating a first local signal having a first frequency and a second signal having a second frequency which is a multiple of the first frequency, wherein the first frequency is variable;

a receiving local oscillator for generating a receiving local signal having a variable receiving local frequency;

a transmitting local oscillator for generating a transmitting local signal having a variable transmitting local frequency;

a receiving circuit for receiving a high-frequency signal in a selected one of the two different bands using the first local signal and the receiving local signal; and a transmitting circuit for transmitting a high-frequency signal in a selected one of the two different bands using the second local signal and the transmitting local signal, the method comprising the steps of:

a) causing the local oscillator to set the first frequency near the second band and to set the second frequency near the first band;

b) causing the receiving local oscillator to set the variable receiving local frequency to enable the receiving operation in the second band: and c) causing the transmitting local oscillator to set the variable transmitting local frequency to enable the transmitting operation in the first band.

15. The method according to claim 14, wherein one of the variable receiving local frequency and the variable transmitting local frequency is fixed.

16. The method according to claim 14, wherein the first band is associated with PCS (Personal Communications Service) and the second band is associated with AMPS (Advanced Mobile Phone Service).

17. The method according to claim 14, further comprising the step of:

monitoring a propagation condition in the second band based on a received signal obtained by the receiving operation of the step b).

* * * * *